United States Patent

[11] 3,595,327

| | | |
|---|---|---|
| [72] | Inventor | Theodore R. Self<br>Lynch, Ky. |
| [21] | Appl. No. | 848,988 |
| [22] | Filed | Aug. 11, 1969 |
| [45] | Patented | July 27, 1971 |
| [73] | Assignee | United States Steel Corporation |

[54] ROTARY DRILL BIT AND HOLDER
12 Claims, 9 Drawing Figs.

[52] U.S. Cl. .................................................. 175/410, 175/394
[51] Int. Cl. .................................................. E21b 9/36
[50] Field of Search .................................................. 175/410, 411, 394, 421, 2 B

[56] References Cited
UNITED STATES PATENTS

| | | | |
|---|---|---|---|
| 2,740,611 | 4/1956 | Bowen............................ | 175/411 X |
| 3,022,840 | 2/1962 | Hohos et al...................... | 175/213 X |
| 3,089,552 | 5/1963 | Black et al....................... | 175/410 X |
| 3,163,246 | 12/1964 | Vagins et al. .................. | 175/410 |
| 3,434,553 | 3/1969 | Weller............................ | 175/410 |

FOREIGN PATENTS

| | | | |
|---|---|---|---|
| 584,358 | 9/1933 | Germany....................... | 175/410 |
| 423,647 | 2/1935 | Great Britain................. | 175/410 |

*Primary Examiner*—James A. Leppink
*Assistant Examiner*—Richard E. Favreau
*Attorney*—Robert J. Leek, Jr.

ABSTRACT: A combination for drilling a hole in a rock strata is disclosed and has a hollow drill bit holder provided with an exhaust port, a shank receiving opening in one end, and a material receiving surface adjacent the one end. A dill bit has a bit body provided with an insert slot extending across the bit body and having a shank in the shank receiving opening so that the drill bit holder and the drill bit rotate as a unit in one direction. A drilling insert is secured in the insert slot and has a peeling cutter for peeling off substantially large peelings of rock strata, and an outer cutter extending from the peeling cutter to the periphery of the drilling insert for grinding off substantially fine dust from the rock strata. The bit body has a troughing surface sloping away from the peeling cutter and the outer cutter to the material receiving surface. The troughing surface is operable to rapidly guide the peelings and the dust from the peeling cutter and the outer cutter to the material receiving surface and across the material receiving surface to the exhaust port to provide rapid and complete removal of the peelings and the dust. Connecting means are provided for connecting the drill bit holder to the shank, and drive means are used for rotating the drill bit holder and the drill bit to cut the hole in the rock strata.

This combination, as disclosed, is functional to provide improved penetration rates and extended bit life by providing more rapid and complete removal of the peelings and the dust, a reduction in the amount of thrust on the drill bit holder required to drill the hole in the rock strata, and a reduction in the operating temperature of the drill bit.

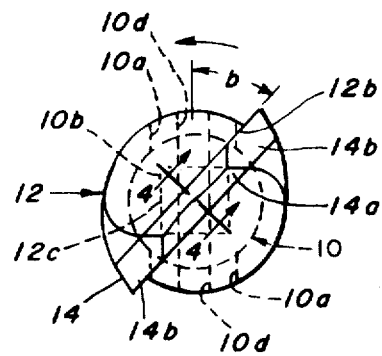
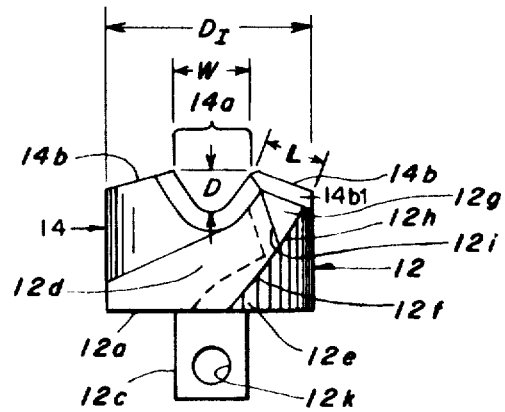
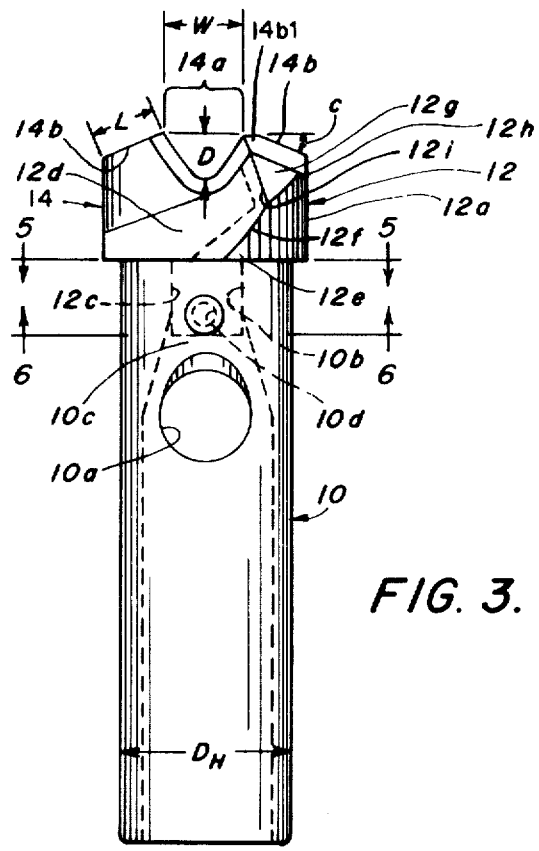
FIG. 1.  FIG. 2.
FIG. 3.
INVENTOR.
THEODORE R. SELF INVENTORS.
THEODORE R. SELF
By
Attorney

ROTARY DRILL BIT AND HOLDER

BACKGROUND OF THE INVENTION

Heretofore, conventional rotary drill bits penetrated roof rock strata or roof rock by means of a grinding action created by rotating the bit in the hole at various r.p.m. and applying sufficient thrust to force it to grind its way through the rock. A vacuum-type dust collector is incorporated into the system to remove the grindings. As these bits penetrate the rock strata, the grinding action creates a large quantity of fine dust and, if the rotation and thrust are increased in an attempt to attain more rapid penetration, the rate of accumulation of fine dust that must be removed from the hole, is also increased. When the rate of penetration more dust than can be removed by the collection system, it becomes necessary to reduce the rate of rotation and thrust or both to the level at which the cuttings can be removed. Penetration rates attainable with these conventional drill bits are limited to the rate at which the cuttings they create can be removed from the hole.

Acceptable bit life, while drilling the harder types of roof strata with conventional bits, is not usually attainable because the grinding action of the bit in contact with the hard rock together with the high thrust, that is necessary to even penetrate the rock, results in rapid wear on the tungsten carbide insert. For the same reason, rapid wear on the tungsten carbide drilling insert is also experienced while drilling the softer types of roof strata when fast rotation is applied to realize maximum penetration rates. In addition to this problem, there is also the problem of poor bit life resulting from a rapid and tremendous buildup of heat in the bit. The shape of the drilling insert on conventional bits is such that a certain amount of dust is always trapped along the leading edges and particularly along the outside corners thereof. The shape of the conventional bit bodies are not conductive to rapid dust collection and, in some cases, actually create an obstruction to the removal of the grindings, etc. The grinding action of the bits in contact with the rock, together with the rotation of the bits in fine dust that is trapped in the hole and dust that cannot be removed at a fast enough rate, creates a rapid buildup of heat that is detrimental to bit life. In some instances, the temperature reaches the point where the forgoing is destroyed by melting, thereby resulting in the total destruction of the bit.

OBJECTS OF THE INVENTION

It is the general object of this invention to avoid and overcome the foregoing and other difficulties of and objections to prior art practices by the provision of a drill bit and the combination of a drill bit holder and drill bit, which:

a. provide an improved rotary drill bit that will penetrate the roof strata in underground mines at a more rapid rate with an accompanying decrease in wear on the bit than on conventional bits;

b. replace a part of the grinding action associated with presently available rock bits with a peeling or chipping action to reduce the volume of material that must be removed by the collection system;

c. reduce the amount of thrust required to attain rapid penetration rates;

d. provide an escape route for most of the grindings, etc., that become trapped in the hole;

e. provide a faster flow of dust and peelings or chips etc., that must be removed by the collection system; and f. reduce the rapid and tremendous amount of heat buildup associated with conventional drill bits.

BRIEF SUMMARY OF THE INVENTION

The aforesaid objects of this invention, and other objects which will become apparent as the description proceeds, are achieved by providing an improved drill bit and the combination of the drill bit and drill bit holder for drilling a hole in a rock strata. The combination has a hollow drill bit holder provided with an exhaust port, a shank receiving opening in one end, and a material receiving surface adjacent the one end. A drill bit has a bit body provided with an insert slot extending across the bit body and having a shank that is inserted in the shank receiving opening of the drill bit holder so that the drill bit holder and the drill bit rotate as a unit in one direction. A drilling insert is secured in the insert slot and has a peeling cutter for peeling off substantially large peelings of rock strata, and an outer cutter extending from the peeling cutter to the periphery of the drilling insert for grinding off substantially fine dust from the rock strata. The bit body has a troughing surface sloping away from the peeling cutter and outer cutter to the material receiving surface of the drill bit holder. The troughing surface is operable to rapidly guide the peelings and the dust from the peeling cutter and the outer cutter to the material receiving surface and across the material receiving surface to the exhaust port in the drill bit holder. Connecting means are provided for connecting the drill bit holder to the shank of the bit, and drive means rotate the drill bit holder and the drill bit to cut the hole in the rock strata.

The combination, as described in the preceding brief summary of the invention, provides more rapid and complete removal of the peelings and the dust from the hole, a reduction in the amount of thrust required to drill the hole in the rock strata, and a reduction in the operating temperature of the drill bit thus resulting in much improved bit penetration rates and extended life of the drill bit.

BRIEF DESCRIPTION OF THE SEVERAL VIEWS OF THE DRAWINGS

For a better understanding of this invention, reference should be had to the accompanying drawings, wherein like numerals of reference indicate similar parts throughout the several views and wherein:

FIG. 1 is a plan view of the improved drill bit holder and drill bit;

FIG. 2 is a side elevational view of the drill bit;

FIG. 3 is a side elevational view of the drill bit holder and drill bit shown in FIG. 1;

Although the principles of this invention are broadly applicable to rock drilling, this invention is particularly adapted for use in conjunction with the drilling of roof holes in a coal mine and hence it has been so illustrated and will be so described.

DETAILED DESCRIPTION

Figure 5:
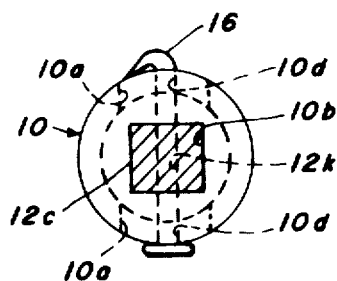
FIG. 5 is a horizontal sectional view of the drill bit holder taken along the line 5-5 of FIG. 3 in the direction of the arrows.

With specific reference to the form of this invention illustrated in the drawings, and referring particularly to FIGS. 1, 3, 5, a hollow drill bit holder is indicated generally by the reference numeral 10.

This drill bit holder 10 is provided with a pair of opposed exhaust ports 10a (FIG. 1, 3, 5), a shank receiving opening 10b (FIGS. 1, 3, 5) and a material receiving surface 10c (FIG. 3).

Figure 6:
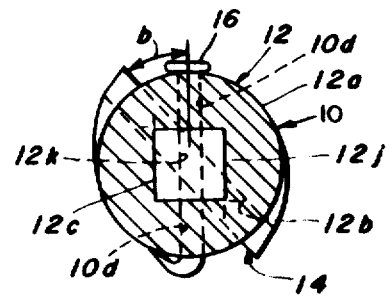
FIG. 6 is a horizontal sectional view of the drill bit taken along the line 6-6 of FIG. 3 in the direction of the arrows.

A drill bit 12 (FIGS. 1—3, 6) is provided in combination with the drill bit holder 10 and has a bit body 12a (FIGS. 2, 3, 6) provided with an insert slot 12b (FIGS. 1, 6) extending across the bit body 12a and having a shank 12c (FIGS. 1, 2, 3, 5, 6) in the shank receiving opening 10b so that the drill bit holder 10 and the drill bit 12 rotate as a unit in one direction, for example counterclockwise, as shown by the arrows in FIGS. 1, 3. The insert slot 12b is disposed at an angle of $b$ (FIGS. 1, 6) in the range of about 35° to 45° with respect to the axis of mounting holes 10d in the drill bit holder 10.

Figure 4:
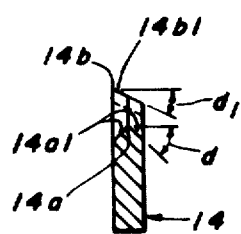
FIG. 4 is a vertical sectional view of the drilling insert and shank of the drill bit taken along the line 4-4 of FIG. 1 in the direction of the arrows.

A drilling insert 14 (FIGS. 1—4, 6) suitably formed of tungsten carbide or the like, is secured, as by brazing or the like in the insert slot 12b and has a peeling or chipping cutter 14a (FIGS. 1, 2, 3, 4) for peeling off substantially large peelings of rock strata. This peeling cutter 14a has double beveled cutting edges 14a1 (FIG. 4) disposed at an angle of d in the range of about 40° to 60° with the horizontal. This cuplike peeling cutter 14a has a depth D (FIGS. 2, 3) in the range of about one-fourth to three-eights of an inch and a width W (FIGS. 2, 3) in the range of about one-half to three-fourths of an inch, depending on the shape of the cuplike peeling cutter 14a (FIGS. 2, 3, 7A, 7B, 7C).

In addition, the drilling insert 14 has a pair of outer cutters 14b (FIGS. 1—4) extending from the outer edges of the peeling cutter 14a to the periphery of the drilling insert 14 for grinding off substantially fine dust and the like from the rock strata. The cutters 14b each have a beveled cutting edge 14b1 (FIGS. 1—4) disposed at an angle $d_1$ (FIG. 4), in the range of about 20° to 25° from the horizontal, a length L (FIGS. 2, 3, 7A, 7B, 7C) in the range of about three-eighths to one-half inches depending on the shape of the peeling or chipping cutter 14a (FIGS. 2, 3, 7A, 7B, 7C), and slope downwardly at an angle c (FIG. 3) of about 20°.

The bit body 12a has a troughing surface 12d (FIGS. 2, 3) sloping away from the peeling cutter 14a and each outer cutter 14b to the material receiving surface 10C (FIG. 3) of the drill bit holder 10. Since the diameter $D_I$ (FIG. 2) of the drilling insert 14 is greater than the diameter $D_H$ (FIG. 3) of the drill bit holder 10, side surfaces 12e (FIGS. 2, 3) of the bit body 12a taper into the troughing surface 12d at 12f (FIGS. 2, 3). Further, a streamlining surface 12g (FIGS. 2, 3) adjacent each outer cutter 14b slopes downwardly to meet side surfaces 12e at 12h and the troughing surface 12d at 12i (FIGS. 2, 3). As shown particularly in FIG. 6, the bit body 12a has a shoulder 12j extending from the shank 12c to the periphery of the bit body 12a.

Connecting means, such as a 06d common nail 16 (FIGS. 5, 6) extending through mounting holes 10d (FIGS. 1, 3, 5) in the drill bit holder 10 and aligned mounting hole 12k (FIGS. 2, 5, 6) in the shank 12c connect the drill bit holder 10 to the shank 12c of the drill bit 12. The sharp end of the nail 16 is bent down flat alongside the drill bit holder 10 to prevent the drill bit 12 from falling out.

Drive means (not shown) but of the type utilized on a rock drill of the type ACME SPHRD-2 manufactured by Acme Machinery Company rotate the drill bit 12 and drill bit holder 10, for example, in the direction of the arrows (FIGS. 1 and 3) to cut the hole (not shown) in the rock strata (not shown).

OPERATION

The drill bit 12 an the drill bit holder 10 are rotated at the appropriate r.p.m. and the appropriate thrust is applied to cut the hole in the rock strata, both not shown. The outer cutters 14b grind off substantially the outer surfaces of the hole (not shown) and the peeling or chipping cutter 14a peels off in substantially large peelings from the remaining middle surfaces of the hole. The grindings from the outer cutters 14b and the peelings from the peeling cutter 14a are deposited on the troughing surfaces 12d (FIGS. 2, 3). The troughing surfaces 12d are operable to rapidly guide the peelings from the peeling cutter 14a and the dust from the outer cutters 14b from the peeling cutter 14a and the outer cutters 14b to the material receiving surfaces 10c and across the material receiving surface 10c to the oppositely disposed exhaust parts 10a, thus providing rapid and complete removal of the peelings and the dust. The improved drill bit 12 and the combination of such drill bit 12 with the drill bit holder 10, provides an improved rotary drill bit 12 that will penetrate the roof strata (not shown) in underground mines at a more rapid rate with an accompanying decrease in wear on the bit 12 than conventional bits by replacing a part of the grinding action associated with presently available rock bits with a peeling or chipping action to reduce the volume of material that must be removed by the collection system, by providing an escape route for most of the grindings, etc. that become trapped in the hole by providing a faster flow of dust, peelings, chips, etc. that must be removed by the collection system, by reducing the amount of thrust required to attain rapid penetration rates, and by reducing the rapid and tremendous amount of heat buildup associated with conventional rock bits.

TEST RESULTS

Table 1 below shows a test comparison of the operation between the improved drill bit 12 and a conventional bit, such as a type 112 VSFC standard bit manufactured by the Carmet Bit Company, in the drilling of roof holes in a coal mine:

TABLE I

| Type bit | Total feet of hole drilled | Average penetration rates feet per min. | Condition of bit |
| --- | --- | --- | --- |
| 112 VSFC standard | 18 | 5.1 | Gauge corners worn beyond further use. Ready for regrinding. |
| Drill bit 12 | 18 | 7.9 | Guage corners starting to wear—good for more footage before regrinding. |

It should be noted that while drilling with the standard bit, some plugging of the collection system was experienced. No plugging was observed while drilling with the drill bit 12, and the increase in the quantity and size of the chips or peelings falling out of the hole indicates that the desired chipping action was being achieved.

Table II below indicates the following results of a similar test:

TABLE II

| Type bit | Total feet of hole drilled | Average penetration rates feet per min. | Condition of bit |
| --- | --- | --- | --- |
| 112 VSFC standard | 35 | 6.4 | Ready for regrinding. |
| Drill bit 12 | 50 | 9.4 | Only slightly worn-good for more footage before regrinding. |

The increase in the amount and size of the chips was again observed while drilling with the bit 12. The penetration rate of 9.4 feet per minute and the decreased wear on the bit 12 compared to the standard bit indicated that the bit 12 was doing more chipping or peeling and less grinding.

Tables IIIa and IIIb below indicate the following results on a third test:

TABLE IIIa

| Type bit | Total feet of hole drilled | Average penetration rates feet per min. | Condition of bit |
| --- | --- | --- | --- |
| 112 VSFC standard | 50 | 4.0 | Carbide chipped along the cutting edges on both sides. Bit worn on gauge corners beyond futher use without regrinding. |
| Drill bit 12 | 30 | 4.5 | Carbide chipped on one side of cutting edges. Gauge corners just starting to wear. Good for several more holes before regrinding. |
| Drill bit 12 | 50 | 7.0 | No chipping of the carbide. Gauge corners just starting to wear. Good for probably 50 more feet of hole before regrinding. |

Table IIIa – Continued

| Type bit | Total feet of hole drilled | Average penetration rates feet per min. | Condition of bit |
|---|---|---|---|
| 112 VSFC standard.. | 10 | 6.6 | Carbide chipped on both cutting edges and down the front on one side. Gauge corners worn beyond further use without regrinding. |
| 112 VSFC standard... | 20 | 9.1 | Slight chipping of carbide on cutting edge of one side. Gauge corners worn beyond further use without regrinding. |
| Drill bit 12.......... | 75 | 9.1 | No chipping of carbide. Gauge corners worn beyond further use without regrinding. |

TABLE IIIb
Test Averages

| Type bit | Total feet of hole drilled | Average penetration rates, feet per min. | Condition of bit |
|---|---|---|---|
| 112 VSFC standard... | 80 | 4.9 | As above. |
| Drill bit 12.......... | 155 | 7.0 | Do. |

Analysis of the test results shows that on the average, the drill bits 12 drilled 94 percent more feet of hole at a 43 percent faster penetration rate than the standard bits. The drill bits 12 used in this series of tests as well as those used during previous tests penetrate the rock strata at a faster rate than any bit that has been tested thus far. In addition to faster penetration rates, the life of the bit 12 is considerably extended. The improvement obtained with the drill bit 12 is no doubt the result of better chipping or peeling action and considerably improved dust collection. The drill bit 12 is undoubtedly providing a better and faster route for the cuttings removable through the drill bit holder 10.

Tables IVa, and IVb below indicate the following results of another similar test:

TABLE IVa

| Type bit | Bit No. | Total feet of hole drilled | Total drilling time, min. | Average penetration rate ft. per min |
|---|---|---|---|---|
| Carmet 1¼″ standard.. | 1 | 27.0 | 5.39 | 5.01 |
|  | 2 | 15.0 | 3.04 | 4.93 |
| 1¼″ drill bit 12........ | 1 | 33.0 | 4.58 | 7.21 |
| Carmet 1¾″ standard.. | 1 | 27.0 | 8.19 | 3.30 |
|  | 2 | 15.0 | 4.25 | 3.53 |
| 1¾″ drill bit 12........ | 1 | 36.0 | 7.30 | 4.93 |

TABLE IVb
Test Averages (All Bits—Drilling 6 Foot Holes)

| Type bit | Total No. of bits tested | Total feet of hole drilled | Total drilling time, min. | Average penetration rate, ft./min |
|---|---|---|---|---|
| Carmet 1¼″ and 1¾″ standard............... | 4 | 84 | 20.87 | 4.02 |
| 1¼″ and 1¾″ drill bit 12.. | 2 | 69 | 11.88 | 5.81 |

In the above tests, the 1¼-inch bits were drilling through 3 feet of what appeared to be a medium hard shale. The 1¾-inch bits were drilling through about three feet of the same type of shale with intermittent thin layers of sandstone. In every case, while drilling with the standard bit, the operator had to retard and sometimes completely stop the feed to let the collection system catch up. Without exception, every time the drill rod was removed from the hole, after drilling with the standard bit, a considerable amount of dust fell out of the hole. While drilling with the bit 12, the operator was able to leave the feed control on full volume. On no occasion did an accumulation of dust in the hole make it necessary to back off on the feed pressure. Upon removal of the drill bit 12, occasionally a very small amount of dust was observed but, in most cases, there was none at all. After the first hole, while drilling with the standard bit, the bit was extremely hot and the rod or drill bit holder was too hot to touch except just above the chuck end. While drilling with the drill bit 12, the bit 12 was moderately hot, but it was possible to hold a bare hand on the drill bit holder 10 just below the bit 12. The holder 10 was only warm from that point on down to the chuck end.

The cuttings examined in the dust box, after drilling with the standard bit, were very fine with a very small number of chips. The same examination, after drilling with the drill bit 12, shows a large quantity of chips mixed in with the fine dust. A large quantity of chips was also observed falling out of the hole while drilling with the drill bit 12.

CRITICALITY

It has been found the ratio of width W (FIG. 2, 3) to the depth D of the peeling cutter 14a is dependent upon the hardness of the roof strata being drilled, but must be in the range of one-half inch to three-eighths inch to one-half inch for a bit 12 having a diameter $D_j$ of 1¼-inches and in the range of one-half inch to three-eighths inch to five-eighths inch to one-half inch for a bit 12 having a diameter $D_j$ of 1¾-inches.

ALTERNATIVE EMBODIMENTS

Figures 7A, 7B, 7C:
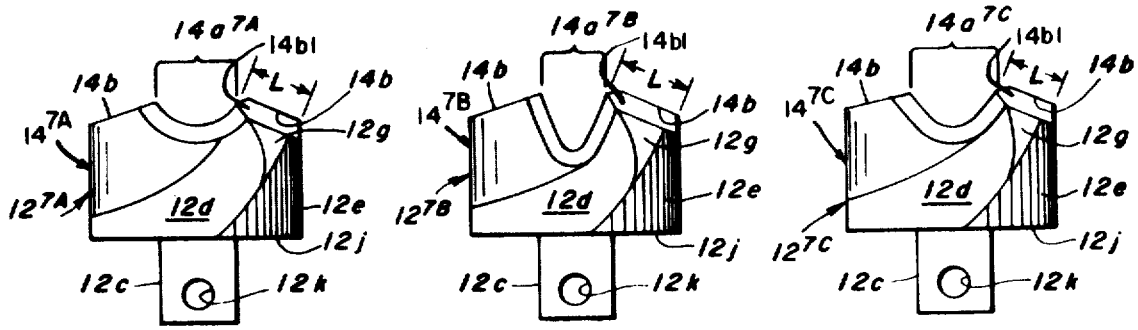
FIGS. 7A—7C are fragmentary side elevational views of alternative embodiments of the drill bit.

It will be understood by those skilled in the art that alternatively the peeling cutter 14a may have in addition to the generally circular concave vertical cross section of FIGS. 2, 3, the generally elliptical concave cross section $14a^{TA}$ shown in FIG. 7A, the generally parabolical concave cross section $14a^{TB}$ shown in FIG. 7B, and the generally hyperbolical concave cross section $14a^{TC}$ shown in FIG. 7C.

SUMMARY OF THE ACHIEVEMENT OF THE OBJECTS OF THE INVENTION

It will be recognized by those skilled in the art that the objects of this invention have been achieved by providing an improved drill bit 12 and the combination of such drill bit 12 with the drill bit holder 10, which provide an improved rotary drill bit 12 that will penetrate the roof strata in underground mines at a more rapid rate with an accompanying decrease in wear on the bit 12 than conventional bits, replaces a part of the grinding action associated with presently available rock bits with a peeling or chipping action to reduce the volume of material that must be removed by the collection system; reduces the amount of thrust required to attain rapid penetration rates; provides an escape route for most of the grindings, etc. that become trapped in the hole; provides a faster flow of dust, peelings, chips, etc. that must be removed by the collection system; and reduces the rapid and tremendous amount of heat buildup associated with conventional rock bits.

While in accordance with the patent statutes a preferred and alternative embodiments of this invention have been illustrated and described in detail, it is to be particularly understood that the invention is not limited thereto or thereby.

I claim:

1. For drilling a hole in a rock strata the combination of:
   a. a hollow drill bit holder provided with an exhaust port, a shank receiving opening in one end, and a material receiving surface adjacent said on end,
   b. a drill bit having:
      1. a bit body provided with an insert slot extending across said bit body and having a shank in said shank receiving opening so that said drill bit holder and said drill bit rotate as a unit in one direction,
   c. a drilling insert secured in said insert slot and having:
      1. a peeling cutter for peeling off substantially large peelings of rock strata,
      2. an outer cutter extending from one side of said peeling cutter to the periphery of said drilling insert for grinding off substantially fine dust from said rock strata,
   d. said bit body having a troughing surface sloping away from said peeling cutter and said outer cutter to said material receiving surface,
   e. connecting means for connecting said drill bit holder to said shank, and f. drive means for rotating said drill bit holder and said drill bit to cut said hole in said rock strata, g. said troughing surface being operable to rapidly guide said peelings and said dust from said peeling cutter and said outer cutter to said material receiving surface and across said material receiving surface to said exhaust port to provide improved bit penetration rates, a reduction in the operating temperature of said drill bit and an extended life of said drill bit, h. said peeling cutter defining with said outer cutter a linear cutting point for rapid low friction removal of peelings, chips and the like and being provided with a material removal cavity communicating with said troughing surface for the rapid spacious removal of said peelings, chips and the like from said linear cutting point.

2. The combination recited in claim 1 wherein said material removal cavity is arcuate.

3. The combination recited in claim 1 wherein said material removal cavity has a width W and a depth D, the ratio of W to D being g in the range of about 1¼ to 1½.

4. The combination recited in claim 1 wherein said material removal cavity has a width W and said bit body has an outside diameter of $D_f$, the ratio of W to $D_f$ being in the range of about one-third to one-half.

5. The combination recited in claim 1 wherein said material removal cavity has a depth of D and said bit body has an outside diameter of $D_f$, the ratio of D to $D_f$ being in the range of one-fourth to four-elevenths.

6. The combination recited in claim 1 and wherein said drilling insert has a second outer cutter extending from the other side of said peeling cutter to the periphery of said drilling insert for grinding off substantially fine dust from said rock strata and said bit body has a second troughing surface adjacent said second outer cutter sloping away from said peeling cutter and said second outer cutter to a second material receiving surface.

7. For a hollow drill bit holder provided with an exhaust port, a shank receiving opening in one end, and a material receiving surface adjacent said one end and for drilling a hole in a rock strata:

a. a drill bit having:
1. a bit body provided with an insert slot extending across said bit body and having a shank in said shank receiving opening so that said drill bit holder and said drill bit rotate as a unit in one direction, b. a drilling insert secured in said insert slot and having:
1. a peeling cutter for peeling off substantially large peelings of rock strata,
2. an outer cutter extending from one side of said peeling cutter to the periphery of said drilling insert for grinding substantially fine dust from said rock strata, c. said bit body having a troughing surface sloping away from said peeling cutter and said outer cutter to said material receiving surface, d. said troughing surface being operable to rapidly guide said peelings and said dust from said peeling cutter and said outer cutter to said material receiving surface and across said material receiving surface to said exhaust port to provide rapid and complete removal of said peelings and said dust, to reduce the amount of thrust on said drill bit holder required to drill said hole in said rock strata, and to provide improved bit penetration rates, a reduction in the operating temperature of said drill bit and an extended life of said drill bit, e. said peeling cutter defining with said outer cutter a linear cutting point for rapid low friction removal of peelings, chips and the like and being provided with a material removal cavity communicating with said troughing surface for the rapid spacious removal of said peelings, chips and the like from said linear cutting point.

8. The combination recited in claim 7 wherein said material removal cavity is arcuate.

9. The combination recited in claim 7 wherein said material removal cavity has a width W and a depth D, the ratio of W to D being in the range of 1¼ to 1½.

10. The combination recited in claim 7 wherein said material removal cavity has a width W and said bit body has an outside diameter of $D_f$, the ratio of W to $D_f$ being in the range of about one-third to one-half.

11. The combination recited in claim 7 wherein said material removal cavity has a depth of D and said bit body has an outside diameter of $D_f$, the ratio of D to $D_f$ being in the range of one-fourth to four-elevenths.

12. The combination recited in claim 7 and wherein said drilling insert has a second outer cutter extending from the other side of said peeling cutter to the periphery of said drilling insert for grinding off substantially fine dust from said rock strata and said bit body has a second troughing surface adjacent said second outer cutter sloping away from said peeling cutter and said second outer cutter to a second material receiving surface.

UNITED STATES PATENT OFFICE
CERTIFICATE OF CORRECTION

Patent No. 3,595,327         Dated July 27, 1971

Inventor(s) Theodore R. Self

It is certified that error appears in the above-identified patent and that said Letters Patent are hereby corrected as shown below:

In the Abstract, line 4, "dill" should read -- drill --. Column 1, line 17, after "penetration" insert -- produces --; line 37, "conductive" should read -- conducive --. Column 3, line 2, after "10d" insert -- (FIGS. 1, 3, 5, 6) --; line 41, "06d" should read -- #6d --; line 55, "an" should read -- and --. Column 6, line 19, after "three-eights inch" insert -- to three/fourths inch --; line 61, "on" should read -- one --.

Signed and sealed this 27th day of June 1972.

(SEAL)
Attest:

EDWARD M. FLETCHER, JR.         ROBERT GOTTSCHALK
Attesting Officer                   Commissioner of Patents